United States Patent [19]
Weber

[11] 3,913,872
[45] Oct. 21, 1975

[54] LIGHT TUNNEL FOR UNIFORMLY ILLUMINATING AN OBJECT

[75] Inventor: Paul Egon Weber, Libertyville, Ill.

[73] Assignee: Bell & Howell Company, Chicago, Ill.

[22] Filed: Jan. 18, 1973

[21] Appl. No.: 324,703

[52] U.S. Cl............ 240/41 R; 240/1 LP; 350/96 R; 355/67
[51] Int. Cl.² ..................... F21M 1/00; G03B 27/54
[58] Field of Search .............. 240/1 LP, 41 R, 10 L; 355/67–69, 71, 1; 350/96 R

[56] References Cited
UNITED STATES PATENTS

| | | | |
|---|---|---|---|
| 2,428,975 | 10/1947 | Lamb | 350/96 R |
| 2,981,826 | 4/1961 | Mattern | 240/1 |
| 3,246,133 | 4/1966 | Hensleigh | 240/1 EL X |
| 3,330,190 | 7/1967 | Taillie | 355/1 |
| 3,436,141 | 4/1969 | Conte | 350/96 R |
| 3,437,804 | 4/1969 | Schafer et al. | 240/1 LP |
| 3,491,245 | 1/1970 | Hardesty | 350/96 R |
| 3,514,200 | 5/1970 | Bowker | 355/1 |
| 3,546,438 | 12/1970 | Buc et al. | 350/96 X |
| 3,560,084 | 2/1971 | Limberger | 355/1 |
| 3,561,867 | 2/1971 | Simmon | 355/67 |
| 3,650,598 | 3/1972 | Ketane | 350/96 R |
| 3,684,371 | 8/1972 | Ketane et al. | 355/71 |
| 3,731,107 | 5/1973 | Goodwin et al. | 350/96 R |
| 3,752,561 | 8/1973 | Klent | 350/96 R |

*Primary Examiner*—Samuel S. Matthews
*Assistant Examiner*—E. M. O'Connor
*Attorney, Agent, or Firm*—Robert A. Walsh

[57] ABSTRACT

A light tunnel for unidirectionally and totally illuminating an object located perpendicular to the long dimension adjacent the exit aperture of the tunnel. In one embodiment, certain portions of the inner surfaces of the light tunnel are coated with a light absorbing coating which absorbs all higher order light rays, while allowing all lower order light rays to pass without interference to the aperture at the tunnel exit. In a further embodiment, the angle at which the light enters the tunnel through an entrance aperture is varied to maintain uniform exit aperture illumination. In still another embodiment, a coating of light-absorbing material adjacent the entrance aperture of the light tunnel permits only light entering the tunnel within a predetermined angular range to pass through the tunnel to the exit aperture.

2 Claims, 6 Drawing Figures

LIGHT TUNNEL FOR UNIFORMLY ILLUMINATING AN OBJECT

The present invention relates to an illumination device, and in particular to a light tunnel or guide for illuminating an elongated slit whereby the integral of light in every plane parallel to the short dimension of the slit, and perpendicular to the plane of the slit, is the same over the entire slit length.

In machines designed to photoreproduce an original image on a secondary receiving element, it is necessary to illuminate the image as it passes adjacent an illuminating station. The reflected light from the illuminating station passes through a lenticular system to a photoresponsive receiving element which is responsive to the varying patterns of light and dark reflected from the original image. Exposure of the receiving element by the varying degrees of light and dark causes reproduction of the original illuminated image.

The source of light in a photoreproduction machine is usually a spot source illuminating device such as a tungsten-halogen lamp or the like. The light emitted from this lamp radiates in all directions, and the light rays reaching an illuminating station vary in illuminance in inverse proportion to the square of the distance from the source to the surface to be illuminated. In other words, the further a light ray has to travel, the lesser the degree of illuminance produced by that ray at the illuminating station.

Where a light source must necessarily be located at a lateral distance from the centerline of the illuminating station due to the design requirements of the photoreproducing machine, the degree of illuminance of the light reaching the station varies over the length of the original image adjacent the station. As a result, the light passing from the image through the lenticular system to the photoconductive receiving element varies in intensity causing the reproduced image to be non-uniformly reproduced.

It is a primary object of the present invention to provide means associated with a spot light source for illuminating an elongated slit or station whereby the integral of light in every plane parallel to the short dimension of the slit, and perpendicular to the plane of the slit, is the same over the entire slit length. Means are provided to guide the light from the source to the station such that the image at the station receives light of equal illuminance throughout the long dimension of the slit.

A further object of the present invention is to provide a light guide, including means to transmit therethrough only reflected light rays of the lower order.

Still another object of the present invention is to provide means for illuminating an object at an illuminating station by varying the angle of acceptance or entrance at which light from a spot light source enters a light guide disposed between the spot light source and the illuminating station.

An additional object of the present invention is to provide a light guide between a spot light source and an illuminating station, including means associated with said light guide to absorb all light rays entering said light guide beyond a predetermined entrance angle.

Further objects and advantages of the invention will be apparent from the following description and drawings in which.

Figure 1:
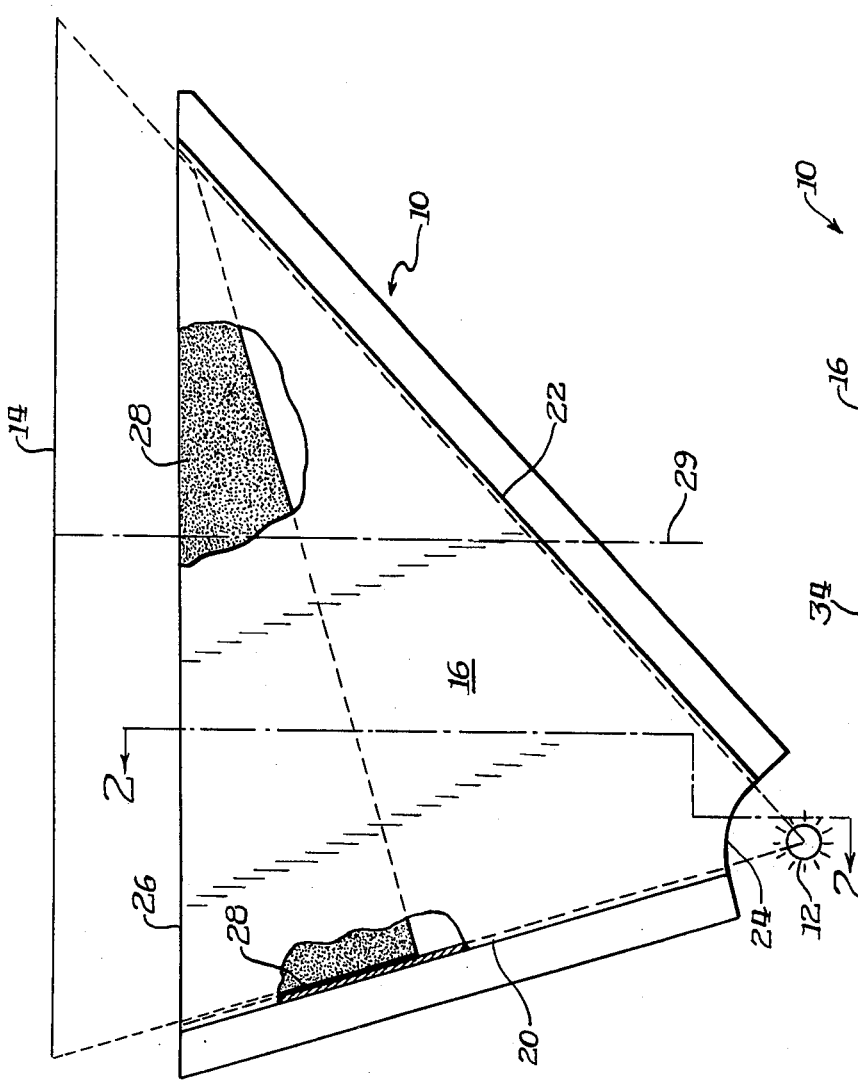
FIG. 1 is a plan view of the light tunnel or guide embodying the present invention.
Figure 2:
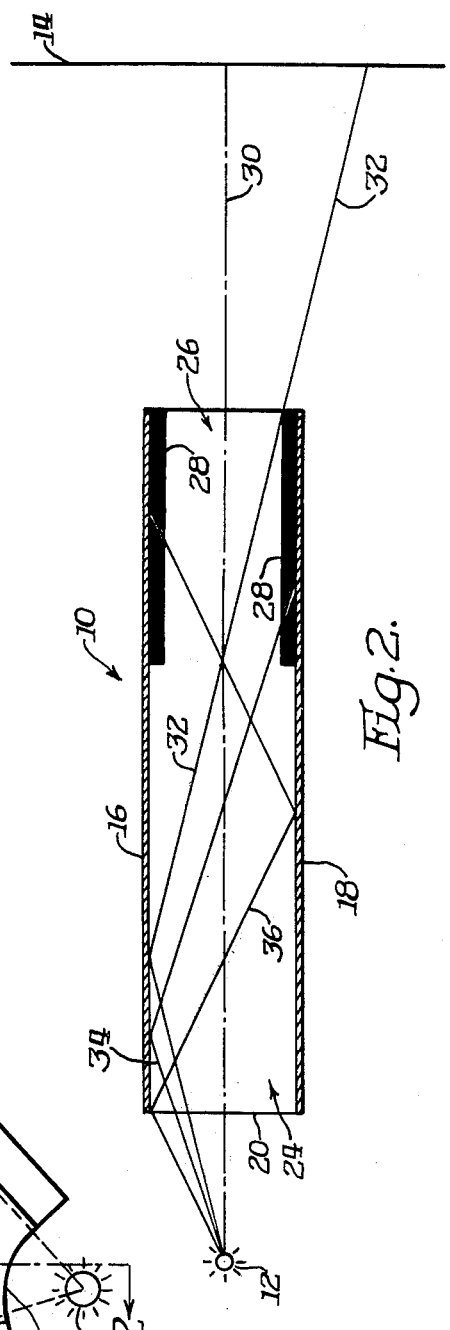
FIG. 2 is a cross-sectional view of the light tunnel of FIG. 1 taken along line 2—2.

Referring to FIGS. 1 and 2, there is illustrated a light tunnel or guide 10 disposed between a light source 12 and an object 14 to be illuminated. In the preferred first embodiment, tunnel 10 comprises two substantially triangular parallel plates 16, 18 spaced apart approximately one-half inch. Plates 16 and 18 are maintained in a parallel relation by end plates 20 and 22 disposed along the lateral sides of light tunnel 10.

The portion of plates 16, 18 adjacent light source 12 are cut to form a curved entrance aperture 24 for the tunnel. As best illustrated in FIG. 2, a quantity of light rays from source 12 pass into tunnel 10 through aperture 24 and are transmitted through the tunnel to exit aperture 26 at the opposite end thereof. Adjacent exit aperture 26 in spaced relation thereto is object 14 which is maintained by suitable means, such as a platen or tray, at an illuminating station such that light rays eminating from exit aperature 26 illuminate a strip-like portion of object 14. Although exit aperture 26 may be, for example, 0.5 inches wide, the strip of light received by object 14 is approximately 0.6 inches wide due to the slight dispersion of light rays as they emerge from exit aperture 26 (FIG. 2).

A portion of the inside reflecting surfaces of plates 16 and 18 are coated with a black light-absorbing mask 28 of pre-determined shape. The surfaces of plates 20 and 22 are completely coated with mask 28. The function of this mask is to absorb all higher order light transmitted through light tunnel 10, while allowing only lower order light to pass to exit aperture 26. This is best understood by referring to FIG. 2, wherein a light source, for example a 150 watt, 24 volt tungsten-halogen lamp with a filament size of 0.23×0.11 inches, is suitably mounted approximately 7.8 inches from the illuminating station where object 14 is located. In this example, the light is also disposed 3.25 inches from the centerline 29 of object 14 (FIG. 1).

Referring to FIG. 2, light rays emitted from light source 12 enter light guide 10 through entrance aperture 24 and are transmitted to exit aperture 26. A portion of the light rays, designated by the numeral 30, travel straight through the guide without being reflected. Other rays, designated 32, 34, and 36 are reflected on time or more from the inside surfaces of plate 16 and 18 before they emerge through exit aperture 26. Rays 34 and 36 are absorbed by mask 28 at their second and third reflection points, respectively.

The number of times a ray of light is reflected in guide 10 determines its "order". For example, light ray 30 is of the zero order since it does not reflect at all in light guide 10. Likewise, rays 32, 34, and 36 are reflected against the walls of the guide 10 one time, two times, and three times, respectively, and are described as first, second, and third order light rays.

FIGS. 1 and 2 disclose the location of light absorbing masks 28 or portions of the top, bottom and sides of the interior of light guide 10. Light ray 36 is of the third order (reflected three times) and after its third reflection is absorbed by mask 28. The same is true for any of the higher order light rays passing through the tunnel. FIG. 1 illustrates the geometric configuration of mask 28 which has been determined empirically to prevent all higher order light rays from passing through exit aperture 26. End plates 20 and 22 are coated throughout with mask 28 to prevent light from reflecting from the side walls. The mask 28 is disposed in light guide 10 in a pattern to ensure that the highest order of light transmitted through the tunnel in a line from light source 12 decreases as the total length of the distance the light travels decreases. The number of orders of light transmitted through the tunnel varies along the long dimension of exit aperture or slit 26. For example, light reaching the illumination station after having travelled the longest distance will not be affected by any portion of mask 28. However, light travelling the shorter distance will be proportionally affected by mask 28 to reduce the intensity of the shorter travelling light rays at the illuminating station.

Figure 3:
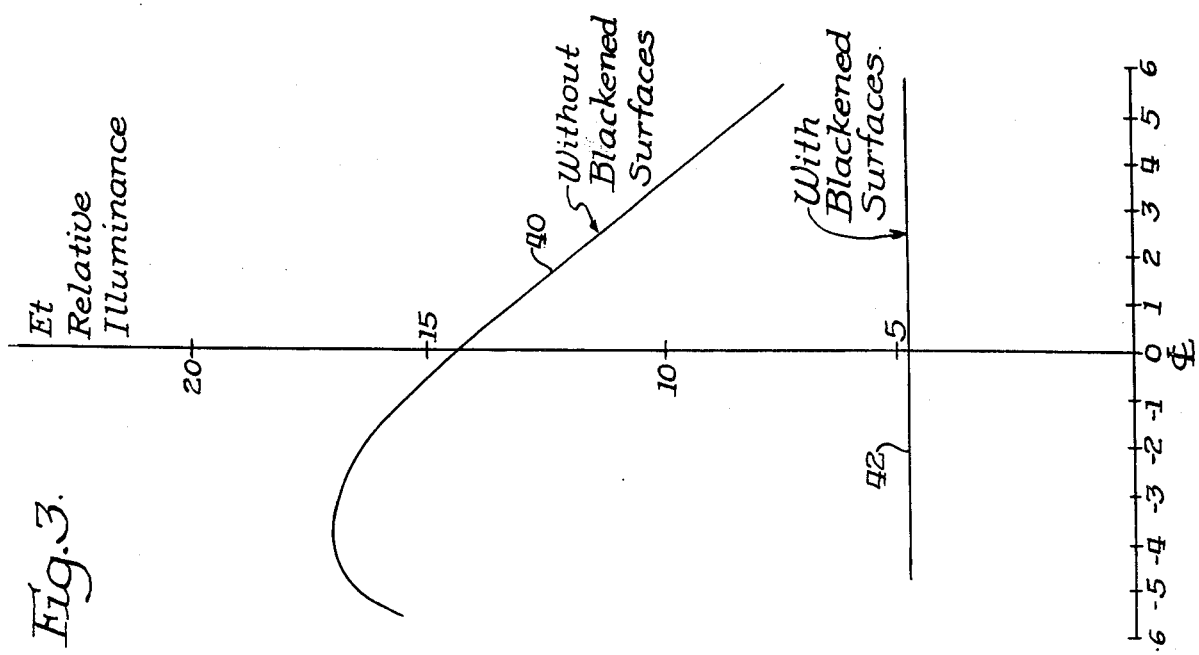
FIG. 3 is a diagramatic illustration of the difference in relative illuminance of light eminating from light guides with and without blackened interior surfaces.

The higher order light rays travel a greater distance to reach exit aperture 26, and, therefore, have a lesser illuminating quality upon reaching object 14 than do the lower order light rays. FIG. 3 diagramatically illustrates the difference in uniformity of illuminance when light guide 10 is used without blackened surfaces (curve 40). From observing curve 42, it is apparent that without the light absorbing mask 28 in light guide 10, object 14 which received the light from source 12 is variably illuminated in inverse proportion to the distance of light source 12 from object 14. However, with the addition of light absorbing mask 28 in the proper geometric configuration (FIG. 1), the relative illuminance of object 12 remains uniform throughout the width of exit aperture 26.

Since the mask 28 absorbs a quantity of the light that normally would pass through light guide 10, the total illuminance of object 14 is reduced when the principles of the present invention are employed. However, the proper amount of light required for photoreproduction can be achieved by increasing the power output of light source 12, if necessary. Increased efficiency in uniform light transmission may be obtained by inserting a frosted glass plate between the filament of light source 12 and light guide 10, and by placing a reflective element behind the light source.

Figure 4:
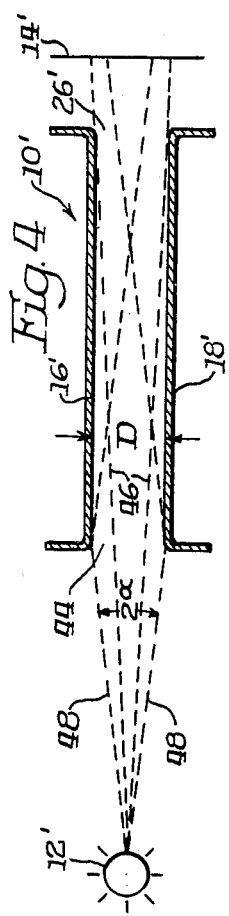
FIG. 4 is a cross-sectional view of an additional embodiment of the invention wherein the varying entrance aperture dimensions of the light tunnel produce the desired uniform illuminance.
Figure 5:
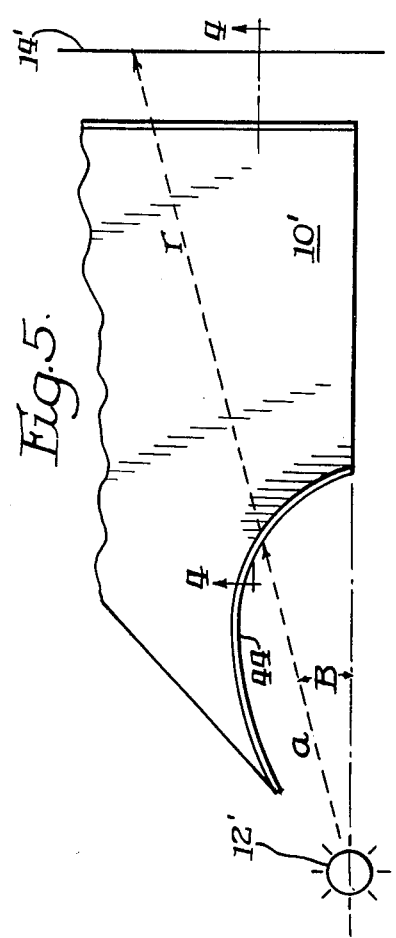
FIG. 5 is a partial elevation view of the light guide of FIG. 4.

A second embodiment of the disclosed inventive concept is illustrated in FIGS. 4 and 5 wherein 10' is a light guide constructed substantially similar to the light guide of FIGS. 1 and 2. 14' designates an object to be illuminated, 12' is a light source, and plates 16' and 18' extend parallel to each other to form light guide 10' having entrance aperture 44 and exit aperture 26'.

In this embodiment, the light absorbing mask 28 of FIG. 1 is eliminated, and the contour of entrance aperture 44 is specifically designed to allow light of varying order to be transmitted through light guide 10' as described in conjunction with the embodiment of FIG. 1. Referring to FIG. 4, the bundle of light rays designated by reference numeral 46, and all those rays falling within the bundle, will pass through light guide 10' and be projceted on to object 14' without being reflected from the interior surfaces of light guide 10'. Light rays 48 enter aperture 44 at a predetermined angle whereby the ray is reflected once from the interior of light guide 10' and then is projected onto object 14'. The angle between both rays 48 in FIG. 4 is designated 2α, which angle is important in deriving the proper configuration for entrance aperture 44, as will be explained.

The distance between light source 12' and entrance aperture 44 along any radial direction r of a ray of light, plus the widest angle of light dispersion (2α or aperture angle) permitted to enter aperture 44, plus the height D of the light guide, are all factors in determining the proper distance $a$ between light source 12' and entrance aperture 44. The proper relationship is thusly described:

$$\tan\alpha = \frac{D}{2a}$$

By use of the foregoing formula, the configuration of entrance aperture 44 is developed as illustrated in FIG. 5, and only those rays from light source 12' which fall within the limits of 2α pass into light guide 10'. It is apparent from FIG. 5 that the order of light rays absorbed, or angular range, differs with angle B.

Figure 6:
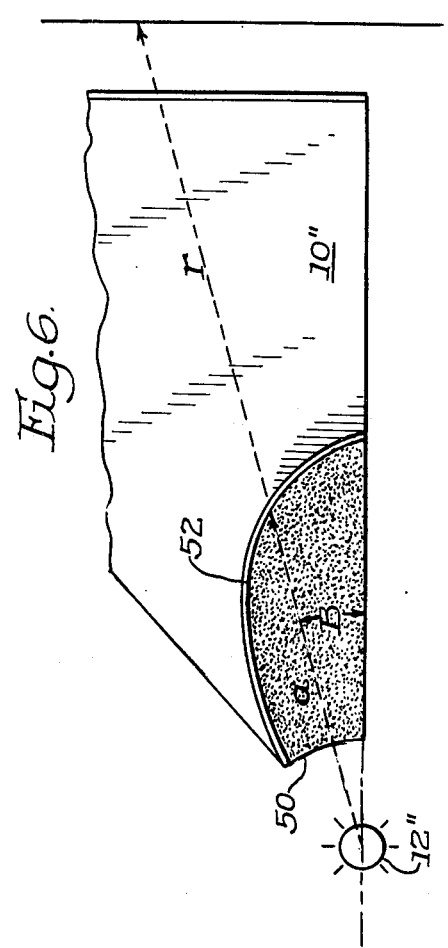
FIG. 6 is a partial elevation view of still another embodiment of the disclosed invention.

A third embodiment of the disclosed inventive concept is illustrated in FIG. 6 which shows a light guide 10'' constructed similarly to light guides 10 and 10' of FIGS. 1 and 4. The entrance aperture 50 is located nearer to light source 12'' than is entrance aperture 44 (FIG. 5). A light absorbing mask 52 is applied to the interior portion of guide 10'' to absorb all higher order light rays eminating from light source 12''. The inner boundary of mask 52 is determined by the formula:

$$\tan\alpha = \frac{D}{2a}$$

referring to those parameters as defined and illustrated in FIG. 5.

Various other modifications and variations may be made to the disclosed apparatus without departing from the spirit and scope of the present invention. Therefore, the invention disclosed is not to be limited to the disclosed embodiments, except as defined by the appended claims:

What is claimed is:

1. A device for illuminating an elongated area of an object disposed at an illumination station whereby the integral of light in every plane parallel to the short dimension of the area is the same, comprising:

a source of light;
a light tunnel having an entrance aperture disposed proximate said light source and an exit aperture whereby a portion of the light emitted by said source passes through said light tunnel from said entrance aperture to said exit aperture, wherein the distance between said light source and any point on said entrance aperture is determined by the following formula:

$$\tan\alpha = \frac{D}{2a}$$

wherein $2\alpha$ = the angle at which said portion of light enters said entrance aperture from the total amount of light emitted by said source;

$D$ = height of said tunnel; and $a$ = distance from said light source to said entrance aperture measured along a line extending from said light source through the center of said light tunnel;

the object being illuminated disposed at the illuminating station adjacent said exit aperture;

said light tunnel including means for providing a substantially equal degree of illuminance from said light source to all portions of said exit aperture;

said light tunnel includes a pair of parallel plates separated by two side plates;

said side plates extending substantially in a line from said light source to the extremities of said exit aperture;

whereby said light from said source passes between said parallel plates and said side plates.

2. A device for illuminating an elongated area of an object disposed at an illumination station whereby the integral of light in every plane parallel to the short dimension of the area is the same, comprising:

a source of light;

a light tunnel having an entrance aperture disposed proximate said light source and an exit aperture whereby a portion of the light emitted by said source passes through said light tunnel from said entrance aperture to said exit aperture;

the object being illuminated disposed at the illuminating station adjacent said exit aperture;

said light tunnel including means for providing a substantially equal degree of illuminance from said light source to all portions of said exit aperture;

said light tunnel includes a pair of parallel plates separated by two side plates;

said side plates extending substantially in a line from said light source to the extremities of said exit aperture;

a light absorbing coating on the inside surfaces of said parallel plates of said light tunnel;

said coating extending from said entrance aperture a specified distance measured from said light source toward said exit aperture whereby said distance is determined by the following formula:

$$\tan\alpha = \frac{D}{2a}$$

wherein $2\alpha$ = the angle at which the total portion of light enters said entrance aperture from said light source;

$D$ = height of said tunnel; and $a$ = distance from said light source to the extremity of said coating on said surfaces measured along a line extending from said light source through the center of said tunnel.

* * * * *